United States Patent [19]
Vensko et al.

[11] Patent Number: 4,567,606
[45] Date of Patent: Jan. 28, 1986

[54] DATA PROCESSING APPARATUS AND METHOD FOR USE IN SPEECH RECOGNITION

[75] Inventors: George Vensko, Ramona; Lawrence Carlin, San Diego; John Potter, Ramona; Allen R. Smith, Poway, all of Calif.

[73] Assignee: International Telephone and Telegraph Corporation, New York, N.Y.

[21] Appl. No.: 439,018

[22] Filed: Nov. 3, 1982

[51] Int. Cl.[4] ................................................ G10L 1/00
[52] U.S. Cl. ...................................... 381/43; 364/900
[58] Field of Search .................................. 381/41–45; 364/513.5

[56] References Cited

U.S. PATENT DOCUMENTS

| 3,940,743 | 2/1976 | Fitzgerald | 364/200 |
| 4,049,913 | 9/1977 | Sakoe | 179/1 SD |
| 4,059,725 | 11/1977 | Sakoe | 179/1.5 D |
| 4,087,630 | 5/1978 | Browning et al. | 179/1 SD |
| 4,158,750 | 6/1979 | Sakoe et al. | 179/1 SD |
| 4,167,653 | 9/1979 | Araseki et al. | 179/1 SC |
| 4,191,858 | 3/1980 | Araseki | 381/31 |
| 4,227,176 | 10/1980 | Moshier | 340/146.3 R |
| 4,227,177 | 10/1980 | Moshier | 340/146.34 |
| 4,239,936 | 12/1980 | Sakoe | 179/1 SD |
| 4,256,924 | 3/1981 | Sakoe | 179/1 SD |
| 4,286,115 | 8/1981 | Sakoe | 179/1 SD |
| 4,319,221 | 3/1982 | Sakoe | 382/34 |
| 4,336,421 | 6/1982 | Welch et al. | 179/1 SD |
| 4,354,225 | 10/1982 | Frieder et al. | 364/200 |
| 4,409,652 | 10/1983 | Neumann et al. | 364/200 |

OTHER PUBLICATIONS

Abstract for "Conceptual System Design for Continuous Speech Recognition LSI"; Ichikawa, Akira; Nakata, Kazuo; Komatsu, Akio; Kitazume, Yoshiaki; Proceedings ICASSP IEEE International Conference Acoustics Speech Signal Process V1, Mar. 30–Apr. 1, 1981, pp. 386–389.

Abstract for "Partial Traceback in Continuous Speech Recognition"; Spohrer, J. C.; Brown, P. F.; Hochschild, P. H.; Baker, J. K.; Proceedings of the International Conference on Cybernetics and Society, 1980, pp. 36–42.

Korn, *Microprocessors* . . . , McGraw-Hill, 1977, pp. 4–16 to 4–24.

*Primary Examiner*—E. S. Matt Kemeny
*Attorney, Agent, or Firm*—John T. O'Halloran; Jeffrey P. Morris

[57] ABSTRACT

A continuous speech recognition system includes a plurality of processors doing template comparisons of speech data. Each processor has an associated memory shared with the other processors by direct memory access (DMA) through a shared data bus. The DMA circuitry is distributed between the processors to eliminate redundancy, since if each processor had a full DMA circuit, one of the circuits would be idle when the processors communicated.

10 Claims, 17 Drawing Figures

FILTER CHARACTERISTICS

| CHANNEL | CLOCK INPUT KHz | CENTER FREQUENCY | 3 dB BANDWIDTH |
|---|---|---|---|
| 1. | 17 | 125 | 26 |
| 2. | 17 | 157 | 33 |
| 3. | | 196 | 41 |
| 4. | | 250 | 53 |
| 5. | 34 | 313 | 66 |
| 6. | | 391 | 82 |
| 7. | | 501 | 105 |
| 8. | 68.2 | 626 | 131 |
| 9. | | 783 | 164 |
| 10. | | 1002 | 210 |
| 11. | 136.5 | 1253 | 263 |
| 12. | | 1566 | 329 |
| 13. | | 2003 | 421 |
| 14. | 273 | 2505 | 526 |
| 15. | | 3131 | 656 |
| 16. | | 4006 | 841 |
| 17. | 546.1 | 5010 | 1052 |
| 18. | | 6263 | 1315 |
| 19. | 819.2 | 7515 | 4359 |

NOTE: THESE ARE NORMAL FREQUENCIES WITH ABOUT ± 5% TOLERANCE

DATA PROCESSING APPARATUS AND METHOD FOR USE IN SPEECH RECOGNITION

BACKGROUND OF THE INVENTION

This invention relates to a distributed processing apparatus and a method for transferring data among a plurality of processors within the apparatus. More particularly, the invention relates to the use of the apparatus and method in continuous speech recognition in real time using a vocabulary of substantial size.

Automatic speech recognition systems provide a means for man to interface with computers and other machines in a human's most natural and convenient mode of communication. Where required, this will enable operators of such computers and machines to enter data, request information and control systems when their hands and eyes are busy, when they are in the dark, or when they are unable to be stationary at a terminal. Also, machines using normal voice input require much less user training than do systems relying on complex keyboards, switches, push buttons and other mechanical devices.

One known approach to automatic speech recognition of isolated words involves the following: periodically sampling a bandpass filtered (BPF) audio speech input signal to create frames of data and then preprocessing the data to convert them to processed frames of parametric values which are more suitable for speech processing; storing a plurality of templates (each template is a plurality of previously created processed frames of parametric values representing a word, which when taken together form the reference vocabulary of the automatic speech recognizer); and comparing the processed frames of speech with the templates in accordance with a predetermined algorithm, such as the dynamic programming altorithm (DAP) described in an article by F. Itakura, entitled "Minimum prediction residual principle applied to speech recognition", IEEE Trans. Acoustics, Speech and Signal Processing, Vol. ASSP-23, pp. 67–72, February 1975, to find the best time alignment path or match between a given template and the spoken word.

Isolated word recognizers such as those outlined above require the user to artificially pause between every input word or phrase. This requirement is often too restrictive in a high workload and often stressful environment. Such an environment demands the very natural mode of continuous speech input. However, problems of identifying word boundaries in continuous speech recognition, along with larger vocabulary demands and the requirement of syntax control processing to identify only predefined meaningful phrases and sentences, requires added and more complex processing.

It is desirable, therefore, to provide the additional processing requirements with a small, low cost apparatus and method which is readily adaptable to growth to accommodate increased vocabulary and syntax demands while at the same time providing reliable and near real time processing.

SUMMARY OF THE INVENTION

A data processing apparatus and method for performing a predetermined function, such as continuous speech recognition, is provided. It comprises at least two processors coupled by a remote bus, each having a shared memory associated therewith and each for performing local processing on data stored in the shared memory. It further comprises data transfer means associated with each of the processors and shared memories, and coupled thereto for transferring at least a portion of the data between the shared memories by direct memory access. The transfer is accomplished during and without interfering with the local processing of the remaining portions of the data present in the shared memories.

Continuous speech recognition is accomplished by converting continuously spoken words into frames of parametric data which are more suitable for further speech processing. The conversion takes place in a front end data processor. A vocabulary of words to be recognized is stored as templates in at least two template processors. Frames of parametric data are transferred to the template processors for comparison with the templates stored therein. Template data is redistributed among the template processors with each new frame of parametric data to be processed while previous frames of parametric data are being processed by the template processors. In the preferred embodiments, there are at least eight template processors and at least three hundred words of vocabulary stored as templates therein.

The DMA circuitry is distributed between the various processors which reduces the circuit complexity and the number of components. Each processor uses only the portion of the DMA which is allocated or distributed to it rather then using the entire circuit, which would be redundant. Since each processor uses its portion of the DMA when communicating to another processor, which has allocated to it the rest of the DMA circuit, the DMA is fully utilized. This eliminates redundancy since if each processor and a full DMA circuit, one of the circuits would be idle when two processors communicated.

BRIEF DESCRIPTION OF THE DRAWINGS

Above-mentioned and other features and objects of this invention will become more apparent by reference to the following description taken in conjunction with the accompanying drawings, in which.

DETAILED DESCRIPTION OF THE INVENTION

Figure 1:
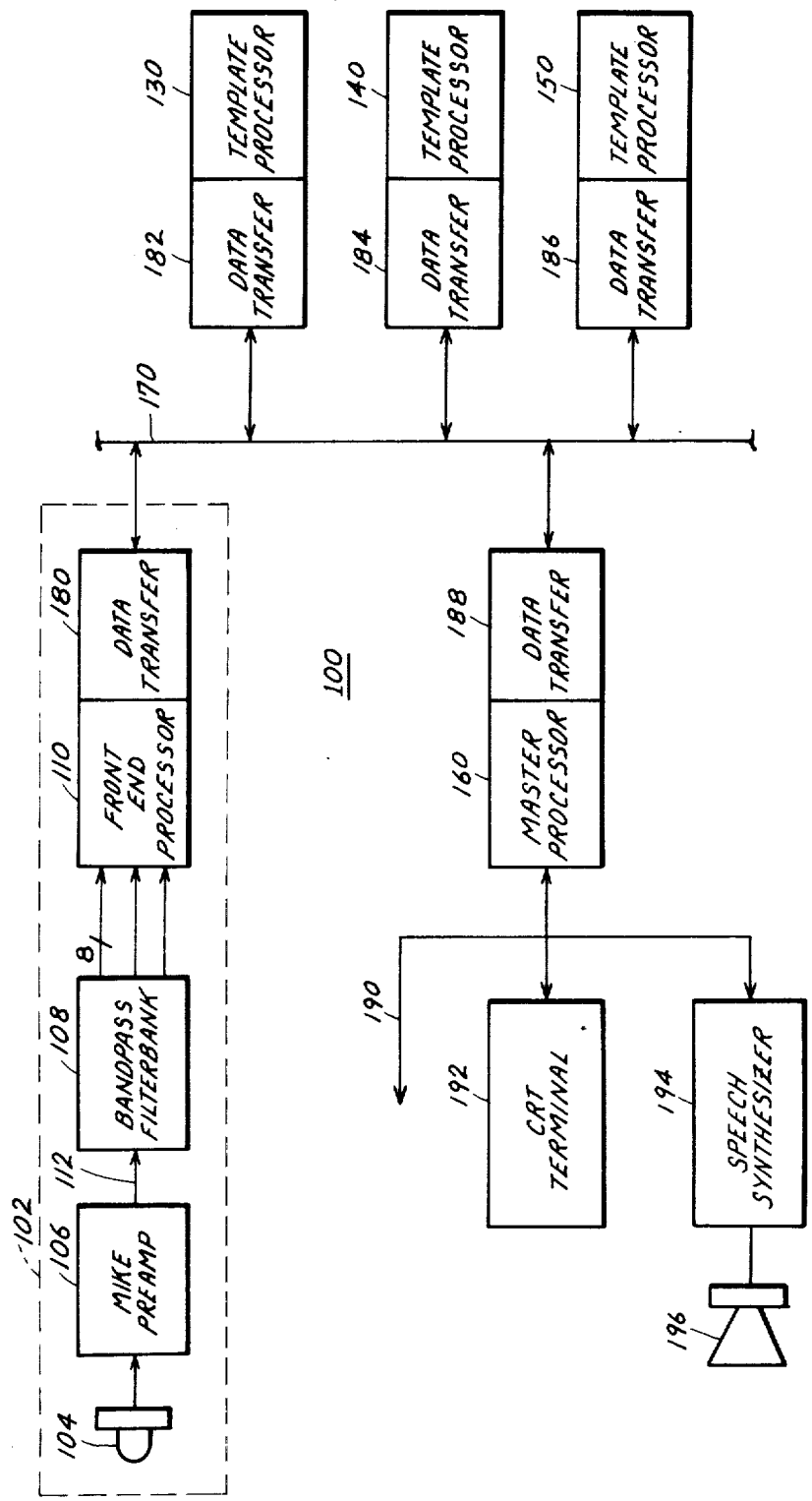
FIG. 1 is a block diagram of the preferred embodiment of the present invention including a plurality of processor/data transfer apparatuses.

FIG. 1 is a block diagram of the preferred embodiment distributed processor apparatus particularly adapted for a continuous speech recognizer apparatus designated generally 100. It comprises a speech converting means designated generally 102 which includes a microphone 104, such as a Shure Brothers, Inc. Model SM10; preamplifier circuit 106, such as Bogen Co. Model No PMM-2 circuit for amplifying the audio input to the microphone 104; a bandpass filterbank circuit 108, such as described in more detail in FIG. 2, for providing a digital spectrum sampling of the audio output of the preamp circuit 106; and a front end processor 110 for processing the spectrum samples to convert them to parametric data more suitable for further speech processing. Apparatus 100 further comprises a plurality of template processors such as processors 130, 140 and 150, which store previously processed words or portions of speech called templates, the template processors functioning to compare the parametric data from the front end processor 110 with the stored templates in accordance with a predetermined algorithm and to store the results; a master processor 160 for syntax analysis of the results received from the plurality of template processors, for controlling transfer of data among the processors 110, 130, 140 and 150, and for performing other system wide functions; a remote connecting bus 170 for providing data flow and control signals among the various processors; and data transfer means 180, 182, 184, 186 and 188 associated with each of the processors 110, 130, 140, 150 and 160, respectively.

FIG. 1 also shows the following additional features: connection of the master processor 160 to a host computer or mass storage via bus 190; a connection to a CRT terminal 192, and connection to a voice synthesizer 194, such as a National Semiconductor DT1000 Digitalker, and speaker 196.

Figure 2:
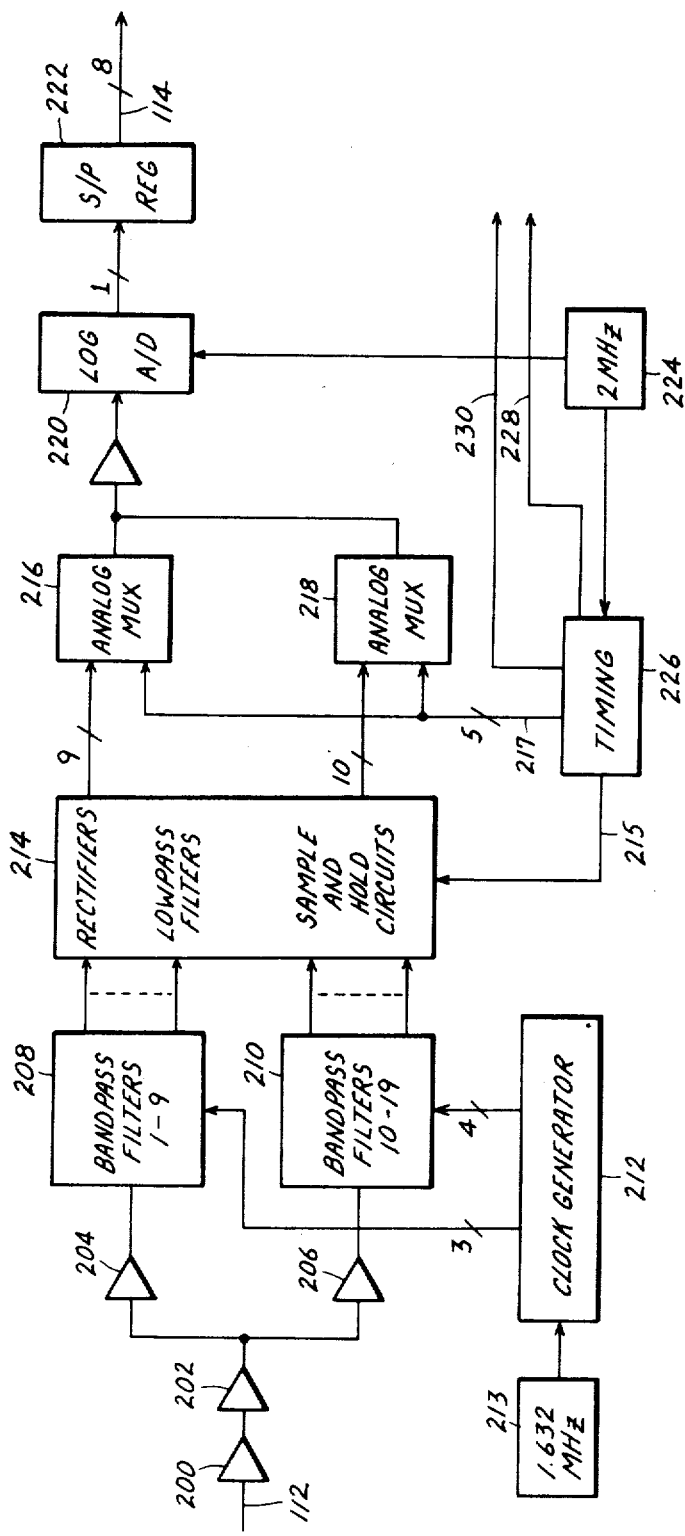
FIG. 2 is a more detailed block diagram of the bandpass filterbank portion of the invention of FIG. 1.

Referring now to FIG. 2, a more detailed block diagram of the bandpass filterbank circuit 108 is shown. The output from preamp 106 on lead 112 from FIG. 1 is transmitted to an input amplifier stage 200 which has a 3 db bandwidth of 10 kHz. This is followed by a 6 db/octave preemphasis amplifier 202 having selectable frequencies of 500 or 5000 Hz. This is conventional practice to provide more gain at the higher frequencies than at the lower frequencies since the higher frequencies are generally lower in amplitude in speech data. At the output of amplifier 202 the signal splits and is provided to the inputs of anti-aliasing filters 204 (with a cutoff frequency of 1.4 kHz) and 206 (with a cutoff frequency of 10.5 kHz). These are provided to eliminate aliasing which may result because of subsequent sampling.

Figures 3, 14:
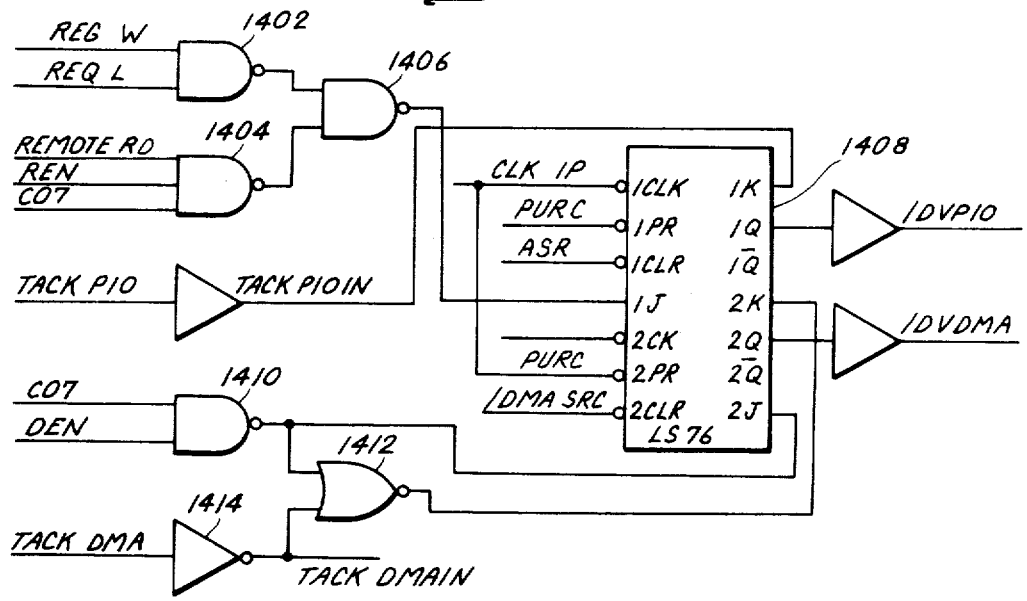
FIG. 3 is a table giving the filter characteristics of the bandpass filterbank portion of FIG. 2.
FIG. 14 is a block diagram portion of the shared controller which generates data valid signals when data is transferred from the shared data bus for transmission over the remote bus.

The outputs of filters 204 and 206 are provided to bandpass filter circuits (BPF) 208 and BPF 210, respectively. BFP 208 includes channels 1–9 while BPF 210 includes channels 10–19. Each of channels 1–18 contains a one octave filter. Channel 19 contains a full octave filter. The channel filters are implemented in a conventional manner using Reticon Model Numbers R5604 and R5606 switched-capacitor devices. FIG. 3 gives the clock input frequency, center frequency and 3 db bandwidth of the 19 channels of the BPF circuits 208 and 210. The bandpass filter clock frequency inputs required for the BPF circuits 208 and 210 are generated in a conventional manner from a clock generator circuit 212 driven by a 1.632 MHz clock 213.

The outputs of BPF circuits 208 and 210 are rectified, low pass filtered (cutoff frequency = 30 Hz) and sampled simultaneously in 19 sample and hold circuits (National Semiconductor Model No. LF398) in sampling circuitry 214. The 19 channel samples are then multiplexed through multiplexers 216 and 218 (Siliconix Model No. DG506) and converted from analog to digital signals in log A/D converter 220, a Siliconix device, Model No. DF331. The converter 220 has an 8 bit serial output which is converted to a parallel format in serial to parallel register 222 (National Semiconductor Model No. DM86LS62) for input to front end processor 110 via bus 114.

A 2 MHz clock 224 generates various timing signals for the circuitry 214, multiplexers 216 and 218 and for A/D converter 220. A sample and hold command is sent to circuitry 214 once every 10 milliseconds over lead 215. Then each of the sample and hold circuits is multiplexed sequentially (one every 500 microseconds) in response to a five bit selection signal transmitted via bus 217 to circuits 216 and 218 from timing circuit 226. Four bits are used by each circuit while one bit is used to select which circuit. It therefore takes 10 milliseconds to A/D convert 19 sampled channels plus a ground reference sample. These 20 digital signals are called a frame of data. Once every frame a status signal is generated from timing generator circuit 226 and provided to front end processor 110 via lead 228. This signal serves to sync the filter circuit 108 timing to the end processor 110 input. Timing generator circuit 226 further provides a 2 kHz data ready strobe via lead 230 to front end processor 110. This provides 20 interrupt signals per frame to processor 110.

The front end processor 110 is programmed in a well known manner (see the Motorola Advance Information Booklet No. AD1-814-R1 for the MC68000 series 16 bit microprocessing units) to take the frames of data (each frame including 19 bandpass filter coefficients) and reduce each frame to 16 coefficients. Then using a known process of variable frame rate encoding, redundant frames of data, i.e. similar frames of data, are eliminated to reduce further processing. Variable frame rate encoding reduces the frame rate from 100 frames/sec (each frame corresponding to 10 milliseconds) to 50 frames/sec on the average.

To further reduce processing the 16 coefficients are reduced to a lesser number such as 5 or 10 by applying a linear transformation to each frame of coefficients to be further processed. One well known transformation is the mel-cosine linear transformation described in the following references: (1) Davis, S. B., and Mermelstein, P., "Evaluation of Acoustic Parameters for Monosyllabic Word Identification", Journal Acoust. Soc. Am., Vol. 64, Suppl. 1, pp. S180-S181, Fall 1978, (abstract); and (2) S. Davis and P. Mermelstein, "Comparison of Parametric Representations for Monosyllabic Word Recognition in Continuously Spoken Sentences", IEEE Trans. Acoust., Speech, Signal Proc., Vol. ASSP-28 pp. 357-366.

The front end processor is also programmed to sum the 19 coefficients in each frame of data received from bandpass filter circuitry 108 as a measure of amplitude of each frame. An energy detection algorithm is then applied to determine the beginning or ending of an utterance or portion of speech. When an utterance is detected, i.e. when the results of the energy detection algorithm indicate that a new portion of speech has begun, the frame of 5 or 10 mel-cosine values is marked and further processing is performed. There is at least one known approach for deriving an energy detection algorithm which would be suitable for the above use. See L. F. Lamel, L. R. Rabiner, A. E. Rosenberg and J. G. Wilpon, "An Improved Endpoint Detector for Isolated Word Recognition", IEEE Trans. ASSP, Vol. 29, No. 4, Aug., 1981.

Each word of the vocabulary that the apparatus 100 is capable of recognizing (in accordance with a predetermined syntax) can be represented by a sequence of a plurality of points taken from a multidimensional mel-cosine space described in the David and Mermelstein articles cited above. For example, a 300 word vocabulary can be represented by different sequences taken from 250 predetermined points. Each of these points after undergoing mel-cosine transformation is represented by 5 or 10 mel-cosine values called a character. There are then 250 characters of 5 or 10 mel-cosine values stored in a character matrix. Each new unknown frame of mel-cosine values to be recognized is converted to a character distance vector of 250 values by calculating the euclidean distances between the unknown frame and each of the characters in the character matrix. This is done in the front end processor 110. The character distance vectors are stored in a buffer in the processor 110 until they are transferred to the template processors by the master processor 160.

A template represents a reference portion of speech such as a vocabulary word constructed from a plurality of characters. Each template represents a word of the vocabulary of the apparatus 100. In a 300 word system, there would be approximately 300 templates stored within a plurality of template processors. The number of templates stored within a template processor and hence the number of template processors required depends on the amount of processing required and how much recognition delay is tolerated. It is estimated that with a 10% real time recognition delay, i.e. 0.3 second recognition delay on a 3 second long utterance, 3-4 template processors will be required.

Each template processor compares each character distance vector received from the front end processor 110 via the remote bus 170 with its assigned templates in accordance with a comparison algorithm programmed within the template processor's programming memory. A suitable algorithm for accomplishing this is the dynamic programming algorithm (DPA) (referred to earlier) or derivatives thereof. Since each character distance vector represents only between 10 and 30 milliseconds of speech time which is much less than the average time taken to speak a word as represented by a template, then many character distance vectors must be compared against each template. One advantage of the DPA is that it compensates for as much as a 4:1 variation in the time taken to speak a word.

During system initialization, the master processor via the circuit means even numbers 182-188 and remote bus 170 will load templates into the template processors so that at the start of the recognition process, the computational load among the template processors will be approximately equal. The master processor also tells each template processor which of its templates to process in accordance with the predetermined syntax.

The master processor, via the circuit means even numbers 180-186 and the remote bus 170, after the beginning of an utterance has been detected, causes the character distance vector to be transferred to each of the template processor for comparison. The master processor via an interrupt commands the template processors to begin processing the character distance vectors on a frame basis. When each template processor has run the DPA on each of the assigned templates for the latest character distance vector and obtained the results, they generate an interrupt to the master processor 160 informing it that the results are ready for transfer. Not all of the template processors will take the same amount of time in processing their assigned templates on a frame by frame basis. The amount of time it does take will be reported along with the DPA results to the master processor. The master processor 110 via the circuit means even numbers 182 through 188 and the bus 170 transfers the results from the template processors to the master processor. The master processor performs a syntax analysis on the results that may cause new templates to be specified for processing on the next frame. Based on the syntax analysis and on the amount of time each template processor is using to process its assigned templates, templates are reallocated among the template processors by the master processor via the circuit means even numbers 182-188 and the remote bus 170. Then a new character distance vector is sent to the template processors and the process begins all over again until recognition is accomplished.

The master processor 160 has three main functions to perform, namely, that of performing syntax analysis from the results of the template processors on a frame basis; controlling the transfer of data via the circuit means even numbers 180-188 and the remote lines 170; and performing system wide functions such as outputting results, providing an operation interface, etc. (other than directing data transfers).

Figure 4:
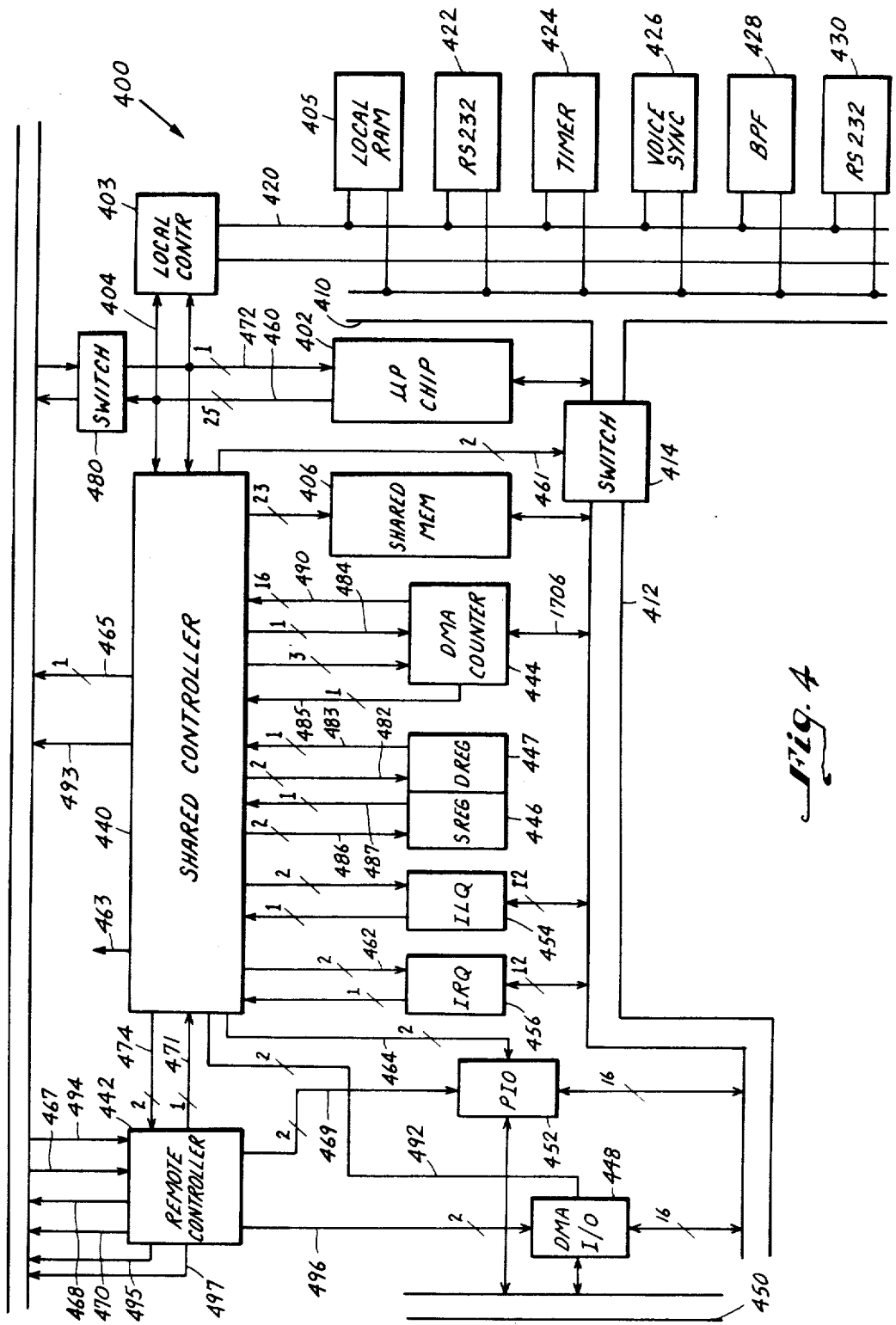
FIG. 4 is a more detailed block diagram of a processor/data transfer apparatus of the invention of FIG. 1.

It should be appreciated that the advantages of the apparatus 100 for use in continuous speech recognition in real time is in its parallel processing and ability to handle a large amount of interprocessor data transfer and communication on a frame by frame basis. (Most utterances will not exceed 3 seconds and a recognition delay of 10% or 0.3 seconds is not perceptible or barely perceptible. For purposes of this application real time will be taken to mean a recognition occurring with a delay in the order of 10% of the utterance duration.) Programmed I/O rates would be inadequate to handle the significant data interchange required here among processors. With the present invention, however, data interchange among processors is accomplished via the circuit means 180 through 188 and remote bus 170 without interfering with the processing work of the various processors. As will be described later, circuitry 180 etc. includes shared and remote controller circuitry which performs synchronization of master processor and other remote requests to the local processor for data transfer in or out of the local processor shared memory. The controller circuitry also prioritizes the requests so that remote requests will not interfere with local processing. Referring now to FIG. 4, an apparatus 400 suitable for use as the processor/circuit means combinations 110/180; 130/182; 140/184; 150/186; and 160/188 is shown in more detail along with a portion of remote bus 170.

The heart of the processor portion of apparatus 400 is a processor chip 402. Other suitable microprocessor devices that could be used to implement the present invention are the Intel 8086 device, the Zilog Z8000, and the AMD2901. Locally, the chip 402 is coupled to: a local controller 403 by a microprocessor control bus 404; and a local random access memory (RAM) 405. The local memory 405 and microprocessor chip 402 are coupled together by a 16 bit local data bus 410. Processing by the particular processors is done in accordance with programs stored in the local memory 405. In the case of a template processor such as processor 130 in FIG. 4, a program for implementing the DPA is stored in local memory. The local controller 403 is coupled to local memory 405 via local control bus 420. A plurality of other devices can be attached to the local control and data buses 420 and 410, respectively. See for example, the RS232 serial I/O interface circuit 422; a timer circuit 424; voice synthesizer interface circuit 426; a BPF circuit interface 423; and a second RS232 serial I/O interface circuit 430. These are all conventional circuits and are illustrated to show the utility of the present design. They are not described in detail herein.

The circuit means of apparatus 400 associated with the local processor portion described above comprises: a shared memory 406 coupled to a 16 bit shared data bus 412 which in turn is connected to the bus 410 by a conventional bus switch 412; a shared controller circuit 440; a remote controller circuit 442; direct memory access (DMA) circuitry including DMA counter circuit 444 coupled to the shared controller circuit 440, DMA source and destination registers 446 and 447 and a DMA I/O 16 bit register 448 coupled between a remote data bus 450 and the shared data bus 412; a programmed I/O 16 bit register 452 also coupled between the remote data bus 450 and the shared data bus 412; and local and remote 16 bit interrupt circuits 454 and 456, respectively. The I/O registers 448 and 452 are also coupled to remote controller circuit 442 and shared controller circuit 440 from which they receive control and clocking signals.

Figure 5:
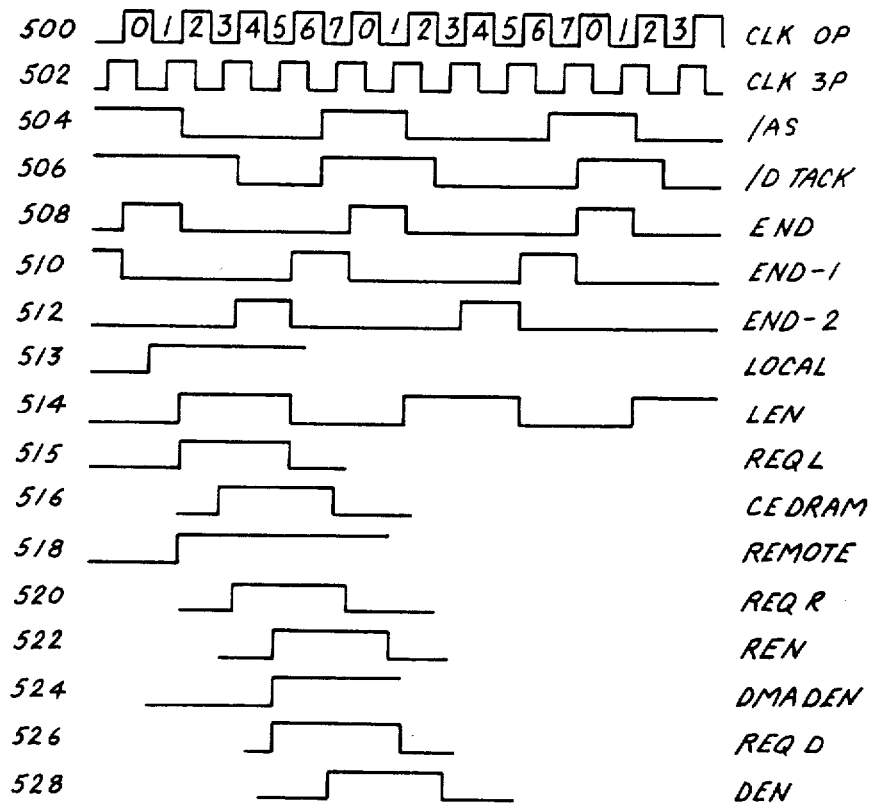
FIG. 5 is a timing diagram showing the basic timing of the processor used in the present invention and the timed request signals for access to the shared data bus portion of the apparatus of FIG. 4.

Before describing the circuits of FIG. 4 in more detail, the basic timing of the microprocessor unit 402 is provided in connection with the timing diagram of FIG. 5. The MC68000 uses an 8 MHz clock signal 500 generated from an external clock. The data transfer cycles of the microprocessor are synched to this clock and each cycle can be thought of as eight clock states 0-7. From this clock an 8 MHz clock 3P signal 502 is generated using conventional timing circuit design techniques. Clock 3P (502) leads the 8 MHz clock 500 by one-half pulse width. Another clock, CLK1P, not shown, used by the circuit of FIG. 4, is 180° out of phase with CLK3P. The MC68000 generates an address strobe signal /AS 504 which indicates that the asserting microprocessor's address signals (23 bits) are stable and valid. The /AS 504 is negated at the second down stroke of the 8 MHz clock occurring during a /DTACK signal 506 provided to the microprocessor once the data transfer associated with the I/O cycle is complete. As shown by FIG. 5, the MC68000's internal data transfer cycle (read/write) can be performed in a minimum of four 8 MHz clock cycles (eight states, 0-7). It could take longer. If the data transfer takes longer then /DTACK is delayed and negation of the /AS is delayed several clock cycles.

Other timing signals generated in a conventional way and useful in executing local requests by the microprocessor are the END signal 508 corresponding to the first complete clock cycle (states 0 and 1) in a data transfer cycle; END-1 510 and END-2 512 signals which are self-explanatory; and LOCAL 513, LEN 514, REQL 515 and /CEDRAM 516 signals whose purpose will be described later (at this time note that LEN 514 starts at the end of an END pulse and ends at the end of an END-2 pulse).

Referring now to the Figures, an overview of the operation of FIG. 4 is provided. All processor/circuit means combinations 110/180; 130/182; 140/184; 150/186; and 160/188 look substantially the same as the apparatus 400. They are programmed differently to do different tasks and in the preferred embodiment the master processor is the only one which can transmit a 23 bit address to the other processors (slave processors). Also, the interrupt registers 454 and 456 of the master board are not used. When a master wishes to interrupt a slave it uses the slave's ILQ register 454; and when a slave wishes to interrupt the master the slave does so through its own IRQ register 456. Operations and requests made by a microprocessor unit to its own shared bus 412 are called local requests while requests made by a master to use the slave's shared bus are called remote requests.

Figure 13:
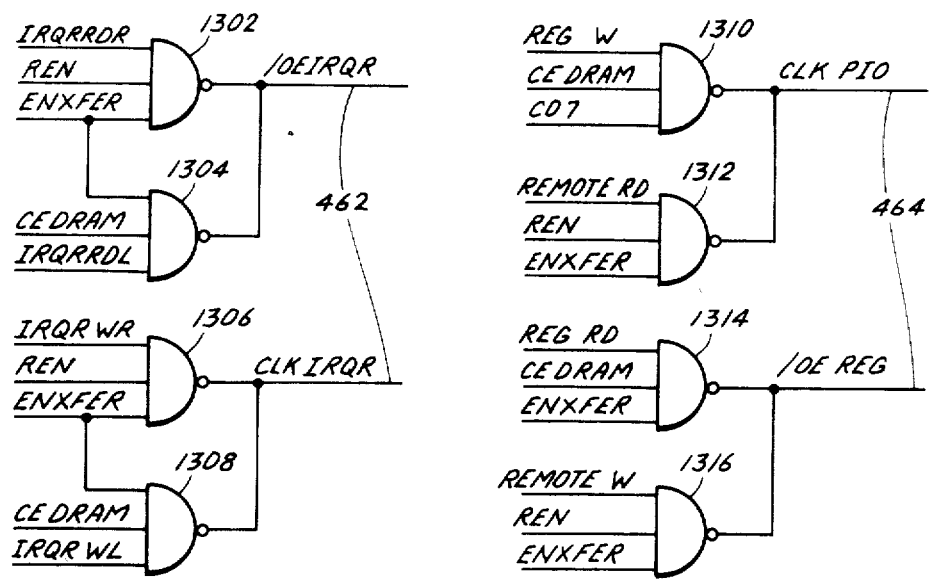
FIG. 13 is a block diagram portion of the shared controller which generates clocking and enabling signals to the devices coupled to the shared data bus of FIG. 4.
Figure 6:
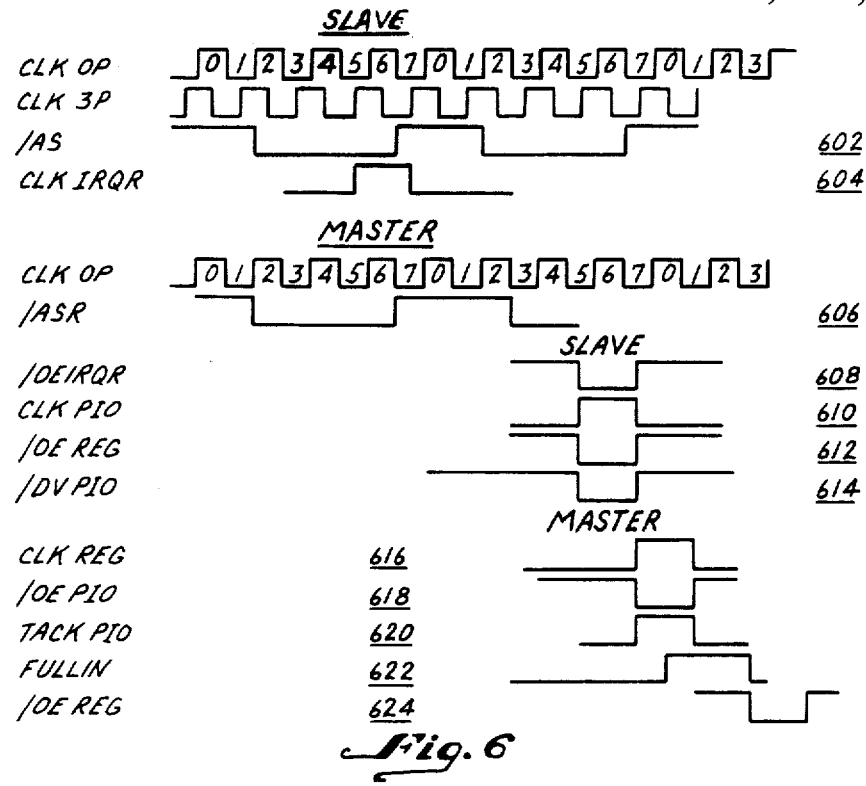
FIG. 6 is a timing diagram of one processor interrupting another processor via the data transfer portion of each.

When the front end of processor 110 is finished generating a character distance vector or when a template processor is finished processing a frame, the processor will interrupt the master processor 160 via the interrupt registers. For example, a slave microprocessor unit 402 sends a 23 bit address along with the address strobe /AS 602 over bus 460 to the slave's shared controller 440. Shared controller 440 decodes the address bits and identifies the remote interrupt request register (IRQ) 456 with an IRQRWL control signal (FIG. 9) as the destination for the data from the microprocessor unit 402. IRQRWL is combined with a timed local request signal CEDRAM 516 and synched (FIG. 13) within shared controller 440 to generate CLKIRQR 604 (FIG. 13). The shared controller 440 via bus 461 opens switch 414 to pass data from microprocessor unit 402 to the shared bus 412. Shared controller 440 loads the data in register 456 with the CLKIRQR which was transmitted over bus 462.

Once the data is latched into interrupt register 456, shared controller 440 sends a 3 bit interrupt signal over bus 463 directly to the microprocessor unit of the master processor. In response the master processor transmits a 23 bit interrupt acknowledge address signal and /ASR 606 via the remote control bus 466 back to the shared controller of the interrupting slave. (The slave processors are wired such that each has a respective interrupt priority with respect to all others. When the master processor returns an interrupt acknowledge address signal it is only received by the slave processor with the highest priority having an outstanding interrupt request.) The slave's shared controller 440 decodes the interrupt acknowledge signals and in response generates a remote read interrupt request control signal (IRQRRDR) (FIG. 9) which is combined with a remote request signal and synched within the shared controller to generate an output enable signal /OEIRQR 608 (FIG. 13) which places the data within the slave's interrupt register on the shared bus 412. At the same time, the slave's shared controller forms a remote write control signal REMOTEW and a remote read REMOTERD control signal (FIG. 9) which are combined with a timed remote request signal and synched to generate a CLKPIO 610 and /OEREG 612 signals which are transmitted to the slave's PIO register 452 via bus 464. The shared controller also forms a data valid signal /DVPIO 614 signal which is formed by combining the REMOTERD control signal with a timed remote request signal and synched within shared controller 440 (FIG. 14). /DVPIO is transmitted over remote control bus 466 to the remote controller of the master processor. The CLKPIO signal clocks the data into the slave's PIO register and the /OEREG signal makes it available to the remote data bus. The /DVPIO signal 614 indicates that data is already transferred into the slave's PIO register 452 or will be transferred in one CLK3P signal.

The master remote controller 442 (see FIG. 15 for details of the remote control) receives the /DVPIO 614 via lead 467 and generates a CLKREG 616 signal and /OEPIO 618 signal which are transmitted over bus 469 to the master's PIO to bring the data from the remote data bus into the master's PIO register. Also, the master's remote controller generates: a TACKPIO signal 620 transmitted via lead 470 back to the slave's shared controller to negate the /DVPIO signal; and generates and transmits a FULLIN 622 signal (FIG. 15) in response to the /DVPIO. FULLIN is transmitted over lead 471 to its shared controller to tell the master's shared controller that the master PIO register 452 has data ready for the shared data bus 412. The FULLIN signal is decoded by the shared controller to produce a REGRD and LOCAL control signal (FIG. 9) which, in turn, are combined with a local request signal and synched to produce /OEREG (FIG. 13) which makes the data in the master's PIO available to the shared data bus. The data is then clocked into the master processor unit. A/DTACK signal is generated (FIG. 10) by the master's shared controller and sent to the master's microprocessor unit 402 via 472.

The data originally sent to the slave's remote interrupt register is a vector which is used by the master to locate a spot in the master's local memory. There the master finds the identity of the slave and the necessary information about the data to be transferred in order to effect a transfer, for example, the identity of the source and destination processors, the location and amount of data to be transferred and where it is to be located in the destination processor. For purposes of the following discussion, the processor who has the data to be transferred is called a source processor while the processor to whom the data will be transferred is called the destination processor. The data to be transferred must be done quickly and during local processing cycles without interrupting those cycles by the processors involved in the transfer. This is done by direct memory access (DMA) data transfer. DMA transfers may be used to transfer character distance vector data from end processor 110 to each of the template processors 130, 140 . . . 150; to transfer template data among the template processors 130, 140 . . . 150; or to transfer template processor results data to the master processor.

Figure 7:
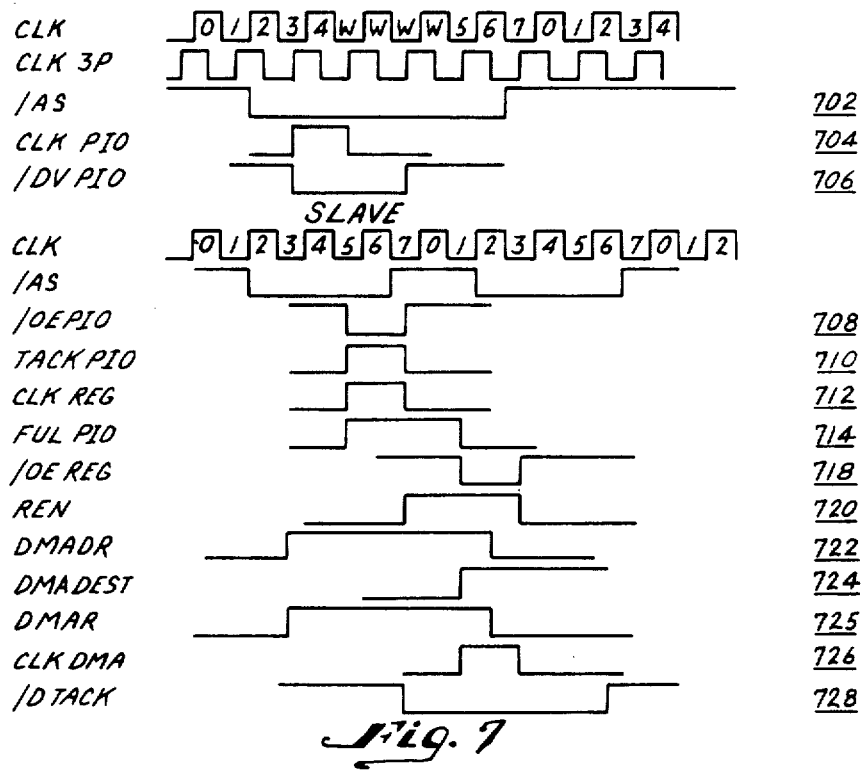
FIG. 7 is a timing diagram of a DMA circuitry portion of a slave processor/data transfer apparatus being instructed by the master processor/data transfer apparatus.
Figure 8:
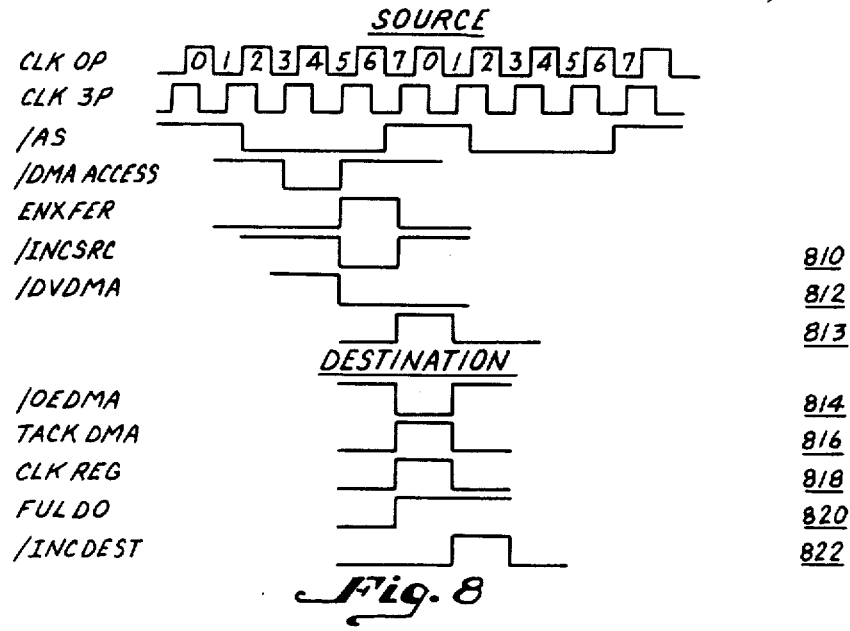
FIG. 8 is a timing diagram of a direct memory access (DMA) data transfer between a source and destination processor of FIG. 1.

To continue, an interrupt of the master processor by a slave processor was described above. The interrupt is used to tell the master that the slave processor which is interrupting is finished a processing task. At this time the master decides on what data transfers are to take place. When the time is right for a transfer based on the received interrupts, the master sets up a DMA transfer using a programmed I/O operation as described below in connection with FIGS. 4, 5 and 7.

In order to effect an interprocessor memory data transfer, such as template data transfer from one slave to another, the master processor through programmed I/O operation writes a 16 bit destination starting address to the destination processor. This tells the destination processor where the data to be transferred is to be stored in its shared memory 406. Next the master processor writes a 16 bit source word count word and a 16 bit source starting address word to the source processor which is to transmit the data. This informaton tells the source processor how much data is to be transferred and where to find it in its shared memory, respectively.

The master processor places the 16 bit destination starting address word on its data bus and transmits a 23 bit address word and /AS 702 to its shared controller over bus 460. The master's shared controller does the following: decodes the address and generates a REGW control signal (FIG. 9) which is combined with a timed local request signal and synched to generate a CLKPIO 704 signal; turns on the data bus switch 414; uses the CLKPIO signal to clock the data from microprocessor unit 402 through switch 414, over shared data bus 412, into the B side of PIO register 452; generates a /DVPIO signal 706 (FIG. 14) which is transmitted over remote bus 466 to the slave processor who will be the destination processor for the data; and opens switch 480 to allow the 23 bit address and /AS to be transmitted to the destination processor via remote control bus 466. The master processor now waits for a /DTACK.

Figure 15:
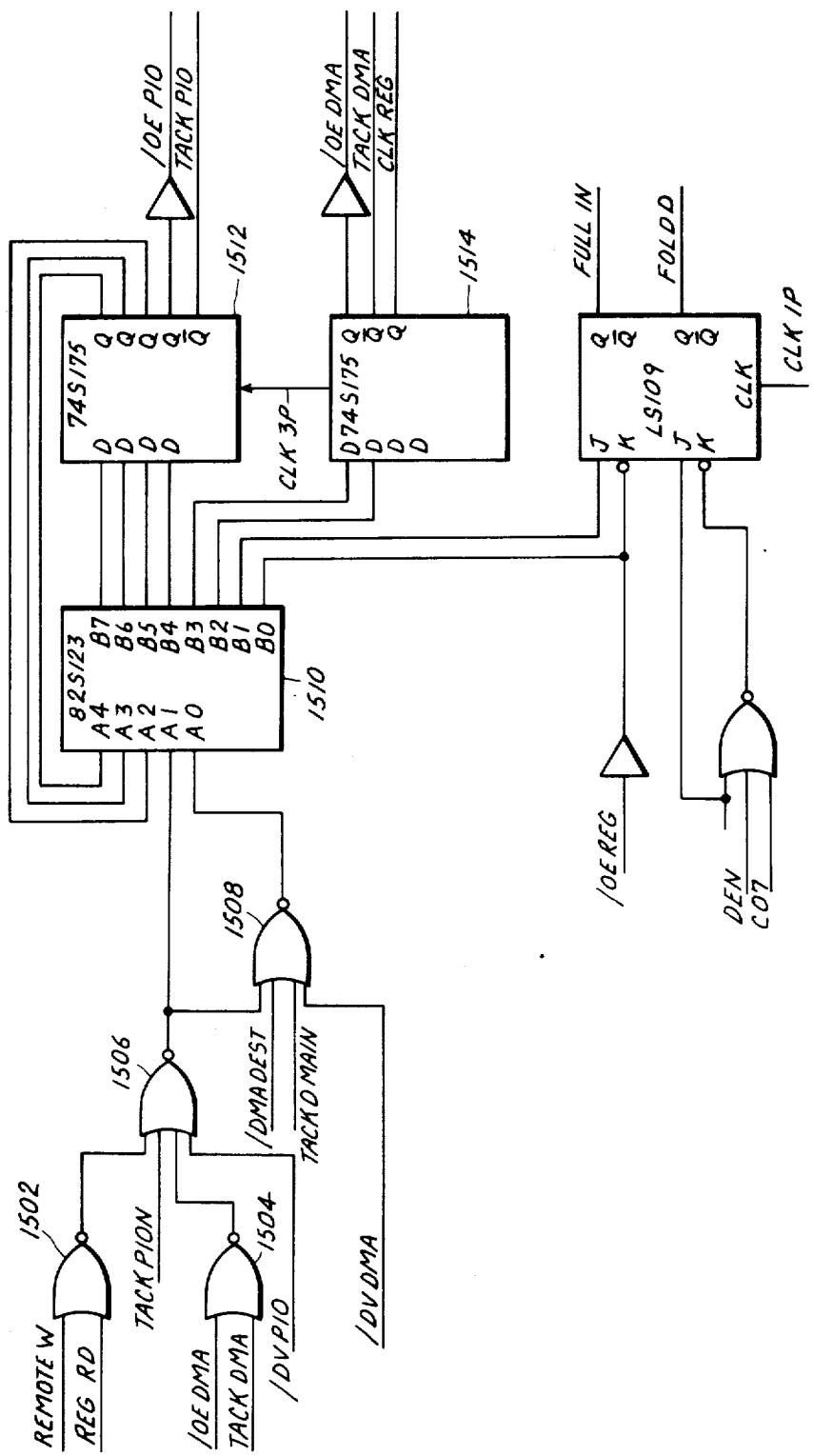
FIG. 15 is a block diagram of the remote controller portion of FIG. 4.

The slave destination shared controller decodes the address signal for its ID and when it finds it the shared controller generates REMOTEW control signal (FIG. 9) which is transmitted to the slave's remote controller via bus 474. This gates the /DVPIO signal transmitted from the master processor into the slave's remote controller 442 (FIG. 15). In response the slave's remote controller (FIG. 15) does the following: it generates /OEPIO 708 which is transmitted to the master's PIO; it generates and transmits TACKPIO 710 back to the master's shared controller to negate the /DVPIO signal; it generates a CLKREG 712 transmitted via bus 469 to the slave's PIO register to clock the destination address word into PIO register; and it generates a FULLIN signal 714 transmitted to the slave's shared controller.

Meanwhile, the destination slave's shared controller also decodes FULLIN and the master's address to generate /OEREG 718 and transmits it to PIO 452 via bus 464. This makes the destination starting address word available on the slave's shared bus 412 for loading into the slave's DMA counter 444.

The slave's shared controller generates a remote request control signal (REQR) which is timed and synched to form REN 720 and generates a DMADR control signal 722 (FIG. 9) which is transmitted via bus 482 to the DMA destination register 447. These signals set register 447 (with CLK3P) which returns a DMADEST signal 724 to the slave's shared controller via lead 483. See FIG. 16. DMADEST is used by the shared controller to generate an increment signal for DMA counter 444 over lead 484. See FIG. 17.

At the same time that the shared controller is decoding DMADR it decodes a DMAR control signal 725 (FIG. 9) which is combined with a timed remote request signal and synched and used by the shared controller to enable (over bus 485) the destination starting address to be clocked (CLKDMA 726) into the DMA counter. See FIG. 17. The shared controller also generates a /DTACK 728 which is transmitted back to the master microprocessor to negate /AS.

The master processor begins two more programmed I/O transfers: (1) to load the source word count word into the source processor's DMA counter; and (2) to load the source starting address word into the DMA counter. The words are loaded in the same way as the destination starting address described above. However, as the DMA source starting address is loaded into DMA counter 444, the source shared controller decodes the master processor's address to generate a DMASR control signal (FIG. 9) which is combined with a timed remote request signal and synched to set the DMA source register 446 via bus 486. The register 486 then transmits a DMASRC signal back to shared controller 440 via lead 487.

A DMA data transfer through DMA circuitry is accomplished by transmitting the 16 bit source or destination starting address stored in DMA counter 444 to shared controller 440 via bus 490 where the address is decoded to select the proper memory location in shared memory 406. After the data is transferred the address is incremented. A detailed description of this process is given below.

A DMASRC or DMADEST signal (set in registers 446 and 447, respectively) is required to establish a timed and synched DMA request to transfer data from microprocessor to microprocessor via DMA circuitry. A DMASRC signal is used on the rising edge of a CLK3P to increment the source starting address stored in the source DMA counter. Similarly, the DMADEST signal is used to increment the destination DMA counter.

A properly timed and synched DMASRC signal from the source shared controller generates an /INCSRC 810 signal (FIG. 17) which clocks the data from the shared memory 406 over shared bus 412 into the B side of DMA I/O register 448. At the same time, the source shared controller generates a data valid /DVDMA signal 812 (FIG. 14) which is transmitted over lead 493 to remote bus 466 and then over lead 494 to the destination remote controller. In response the destination remote controller does the following: it generates /OEDMA 814 (FIG. 15) which is transmitted over lead 495 to remote control bus 466, through the source shared controller, and then over bus 496 to the source DMAI/0 to place the data stored therein on the remote bus 450; it generates and transmits TACKDMA 816 (FIG. 15) over lead 497 to bus 466 and then to the source's shared controller to negate the /DVDMA signal; it generates a CLKREG signal 818 (FIG. 15) transmitted via bus 496 to the destination's DMAI/O which loads the data therein from the remote data bus 450; and it generates a FULDD signal 820 (FIG. 15) transmitted to the destination's shared controller where it is combined with DMADEST and ENXFER to generate /INCDEST 822 (FIG. 17) which output enables the data to be transferred onto the destination processor's shared bus. From there the data is clocked into the destination's shared memory in a location identified by the current address stored in the DMA counter. The source and destination counters are automatically incremented and the direct memory access data transfer is repeated at the next available time slot. Signal 813 from flipflop 1722 blocks /INCSRC until a tackdma is generated.

The shared controller 440 performs two main functions: (1) along with other signals like FULLIN, it decodes a portion of the 23 bit address signal received either locally from an associated microprocessor chip 402 or remotely from the master processor chip over remote control bus 466 to generate the various control signals which identify which local device is to be accessed and how, e.g. to read from or write to the shared memory, the DMA circuitry (counter, register and I/O), the interrupt registers, the PIO or the remote controller; and it times and synchronizes the control signal to gain control of the shared data bus 412 without ever interrupting or delaying the local microprocessor chip's access to shared memory 406 via the shared bus 412.

Figure 9:
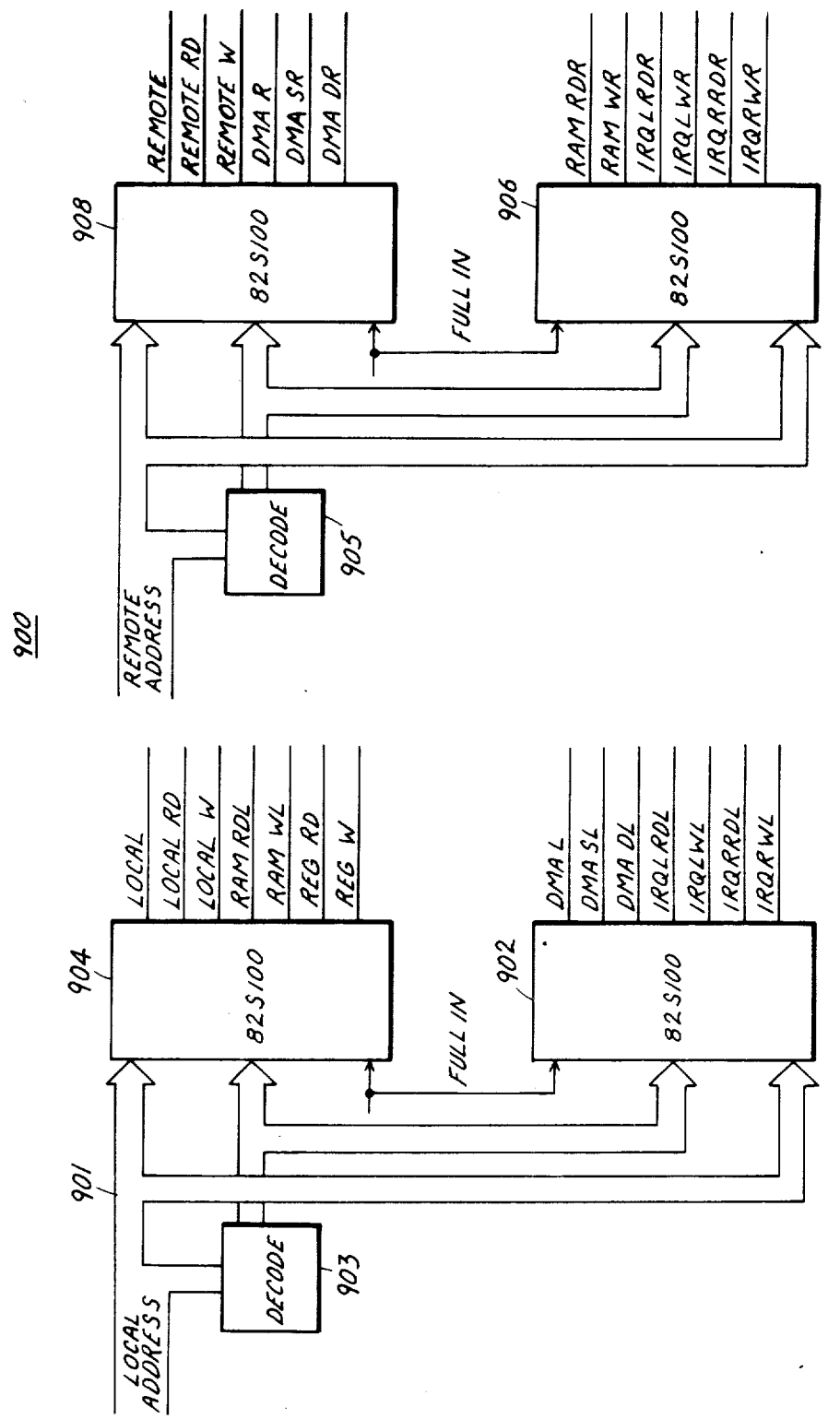
FIG. 9 is a block diagram of address decode circuitry of the shared controller of FIG. 4.

FIG. 9 shows the shared controller's decode logic designated generally 900 in more detail. This logic generates the aforementioned control signals which are mentioned by name in the drawing. For example, the local microprocessor chip 402 transmits an address signal to local decoders 902 and 904, respectively. A portion of the address is first decoded by preliminary decode circuitry 903 before being transmitted to decoders 902 and 904. Decoders 902 and 904 generate the control signals shown. For example, the IRQRWL control signal indicates that the local (L) microprocessor chip 402 wishes to write (W) to the remote interrupt register 456 (IRQ).

Also, shown in FIG. 9 are remote decoders 906 and 908 which, in response to address bits received from the master microprocessor chip, a portion of which pass through preliminary decode circuitry 905, generate the control signals shown. For example, when the master processor wishes to interrupt a slave processor the master sends an address to the slave's shared controller (decoders 906 and 908) and generates a remote (R) write (W) signal to the slave's local interrupt register (ILQ) 454.

In addition to the address bits a FULLIN signal is used by the decode register's even numbers 902–908 when wishing to access the PIO or DMA registers. The FULLIN signal when positive indicates that either the PIO or DMA registers have latched the data. Without FULLIN the control signals for these registers will not be decoded.

From the previous descriptions it will be appreciated that more than one requester can be requesting data transfer over the shared data bus 412 at the same time. For example, at a slave microprocessor the slave microprocessor may be requesting the shared data bus which produces a LOCAL control signal in FIG. 9; the master microprocessor may be requesting the slave's shared data bus producing a REMOTE control signal in FIG. 9; or the DMA source or destination registers 446 or 447 may be requesting the shared data bus in response to DMADEST and DMASRC signals. See FIG. 10. Obviously, not all such requests can be granted at the same time so the requests must be prioritized and timed with a local clock such as CLK3P.

Top priority is given to the local microprocessor chip for control of the shared data bus. When a local request is made, decode circuitry 900 produces a LOCAL control signal 513 which is combined with a LEN signal 514 to produce a one cycle REQL signal 515. This signal is timed with CLK3P to produce a timed local shared data bus request signal CEDRAM 516. This signal gives control of the shared data bus to the local slave processor chip 402.

Figure 10:
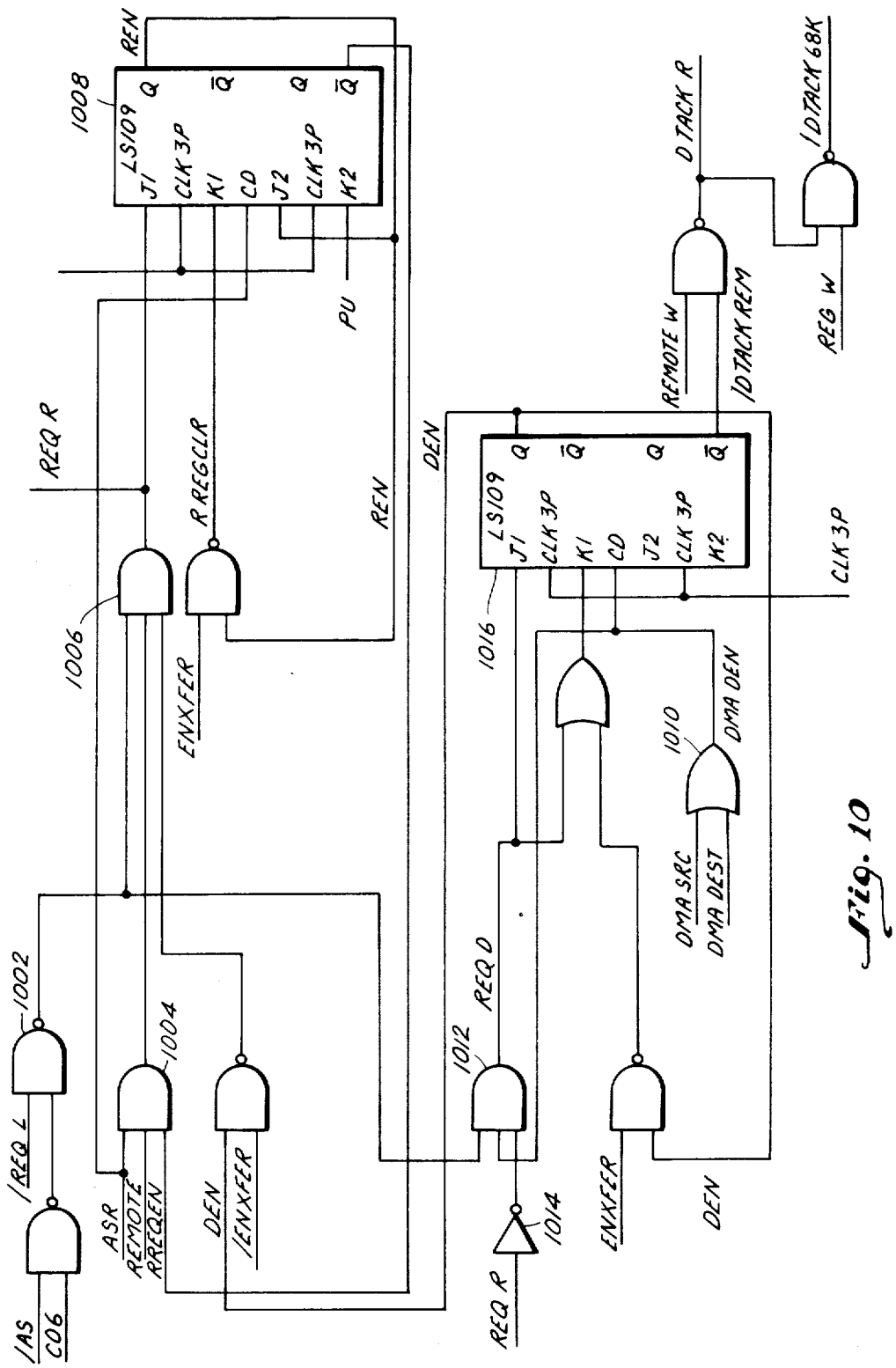
FIG. 10 is a block diagram showing a portion of the shared controller of FIG. 4 for generating prioritized shared data bus requests.

Referring now to FIG. 10, a circuit for prioritizing and timing the shared data bus requests is shown in more detail. If the master processor wants control of a slave's shared data bus a REMOTE signal 518 will be generated by decoder 908. This is combined with the address strobe from the master at AND gate 1004. The output signal from AND gate 1004 is transmitted to AND gate 1006 where it is gated with the output from and remote shared data bus request signal (REQR) 520. If an reql signal 515 is present at the input to AND gate 1002 (low/reql), no REQR 520 signal is possible. The output of AND gate 1006 is transmitted to the J input of dual J-K flip-flop circuit 1008 where it is clocked with CLK3P to generate a timed REQR signal called REN 522.

A DMASRC or DMADEST signal from registers 446 or 447 will generate a positive output from OR gate 1010, signal 524. This signal is transmitted to AND gate 1012 which produces a DMA shared data bus request signal REQD 526. The output of AND gate 1002 is also used to gate AND gate 1012 so that a REQD signal is not possible when an REQL signal is present. Similarly, if an REQR signal is present inverter 1014 provides a low input to AND gate 1012 disabling it. Hence, if an REQL signal is present then neither an REQR or REQD is possible. If an REQR is present then a REQD is not possible. REQD is timed with CLK3P by J-K flip-flop circuit 1016 to produce a timed REQD signal (DEN) 528. /REQL is gated at AND gate 1002 by the output of NOR gate 1001 whose inputs are 10C and C06. C06 extends 1AS to the next CLK3P risising edge when C06 is present.

A local microprocessor chip 402 uses at least four 8 MHz clock cycles to complete a read or write operation. Generally, data is transferred in or out of the chip at the middle of state 3 of the CLKOP. Data transfers in the shared data bus take only two 8 MHz clock cycles with the data on the bus being present thereon for only one clock cycle. If a local request is made for the shared data bus the data will be present on the bus for one cycle from the middle of state 3 until the middle of state 5. However, a new local transfer is not possible until the next state 3. Hence, it is possible to squeeze in the other data transfers on the shared data bus before the next local transfer as long as they are completed by the next state 3. The circuit of FIG. 11 designated generally 1100, part of shared controller 440, is a sequence controller or synchronizer designed to synchronize remote and DMA shared data bus requests with the timing of the local processor. The circuit allows access to the shared data bus and two clock data transfers over the shared data bus to start at the middle of states 3, 5 and 7.

Figure 12:
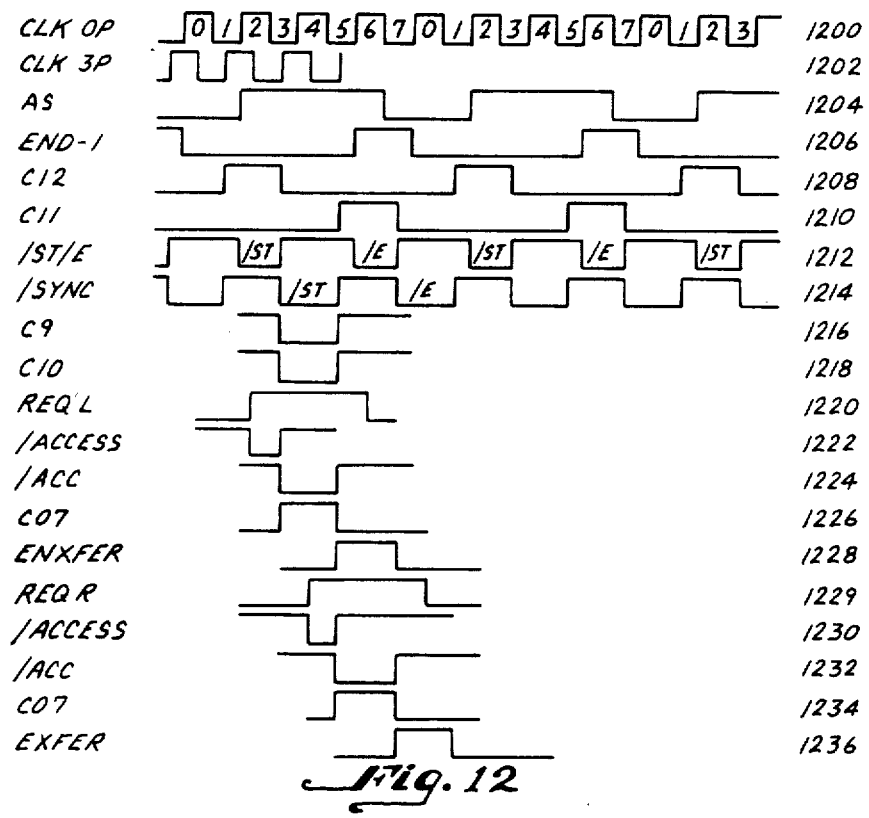
FIG. 12 is a timing diagram of the operation of FIG. 11.

Inputs to the NAND gates 1101–1105 are the local microprocessor address strobe AS, CLK3P, END-1 and the REQL, REQR and REQD request signals from circuit 1000. The circuit produces ENXFER, ENACCESS and C10 used by circuit 1000 to prevent any remote or DMA requests (REQR and REQD) from being formed during the interval between the start of state 2 to the start of state 6. The timing of signals ENXFER and C10 are shown in FIG. 12. Circuit 1100 further comprises input D flip-flop circuitry 1106, PROMS 1108 and 1110, and output D flip-flops 1112, 1114, 1116 and 1118.

Local access to shared data bus (i.e. a data transfer involving microprocessor chip 402) is only allowed starting at the middle of state 3 and ending at the middle of state 5. If no local request is present (no REQL) then an REQR or REQD, if present, will be given access at the middle of state 3. If a local request was present, then a remote request or DMA request can be granted at the middle of state 5. If a remote or DMA shared data bus request arises after state 5 but before state 7, it will be granted at the middle of state 7. No access will be granted to the shared data bus between the middle of state 7 and the middle of state 3 because a local request, if it is to occur, will occur during that period and it must be granted access to the bus when it occurs.

Figure 11:
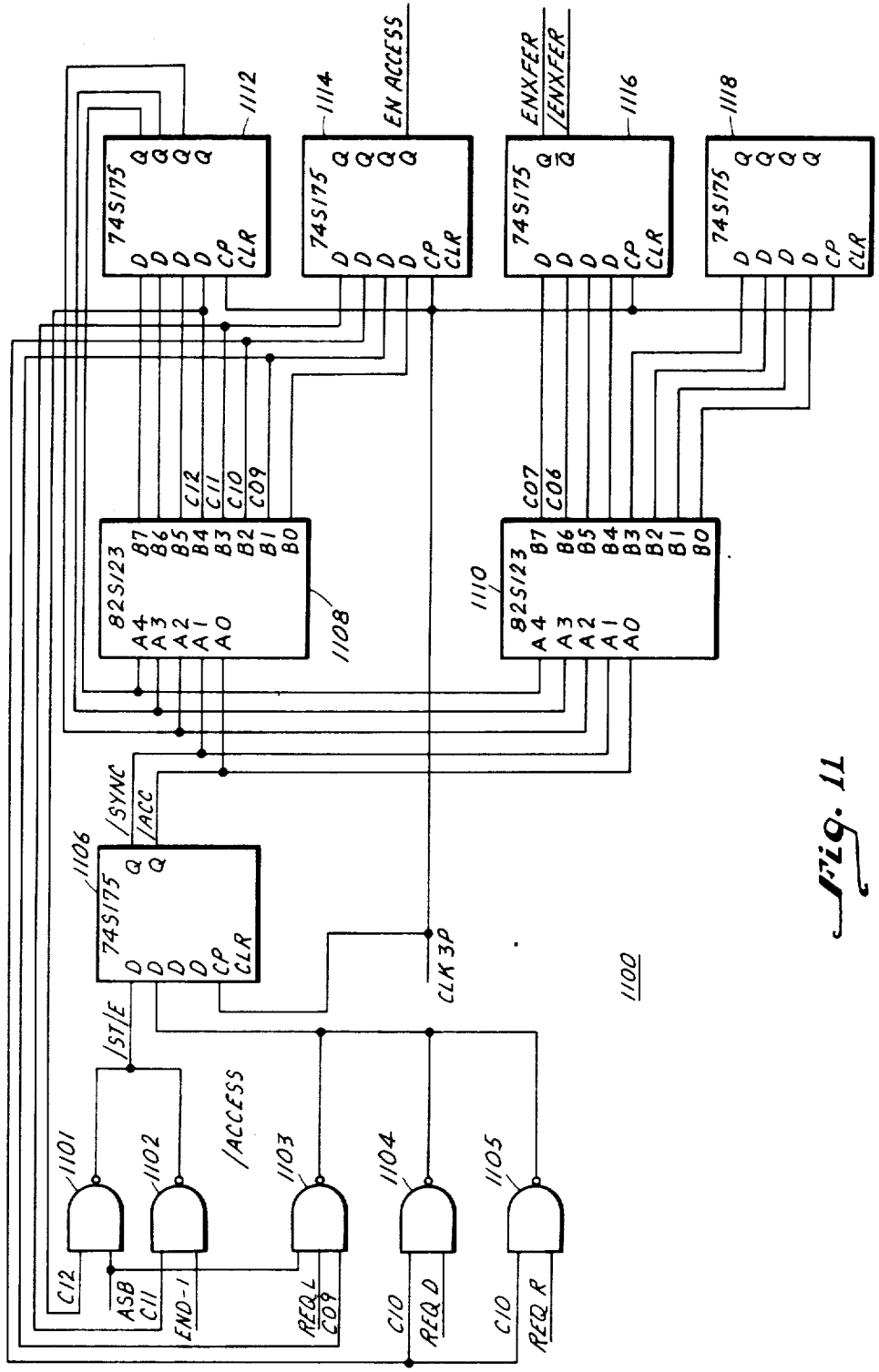
FIG. 11 is a block diagram portion of the shared controller for synchronizing the shared data bus requests with local timing of the processor associated with the shared data bus.

FIG. 12 shows the timing of the circuit of Fig. 11. The AS 1204 and C12 1208 signals combine to provide the start or /ST portion of 1212 on lead 1120 in FIG. 11 while the END-1 and C11 signals combine to produce the end or /E portion. /ST and /E along with CLK3P produce the /SYNC signal 1214. /SYNC causes signals C9 and C10 to go high.

An REQL signal gated by C9 or an REQR or REQD gated by C10 will cause /ACCESS to go low on lead 1122 while /ACCESS combined with CLK3P produces /ACC (signals 1224 and 1232) which can only occur at the middle of states 3, 5 or 7 as earlier indicated because of the presence of C9 and C10. C9 and C10 are produced by the PROM 11 in response to the /SYNC and /ACC signals.

/ACC is transmitted to PROM 11 over lead 1124 where it imediately produces C07 (1226 or 1234) which causes ENXFER (1228 or 1236) to be produced on the next CLK3P cycle from flip-flop circuit 1116.

FIG. 13 shows how the shared controller combi0es the control signals from the decode circuitry of FIG. 9 with timed shared bus requests and synchronization signals from FIGS. 10 and 11 to produce the clocking and output enabling signals for the local and remote interrupt registers 454 and 456, respectively, and the PIO register 452. NAND gates 1302 and 1304 combine inputs to provide an output enable signal for the IRQ register 456 originating from either a local (CEDRAM) or a remote (REN) request. NAND gates 1306 and 1308 combine inputs to generate IRQ clocking signal (CLKIRQR) in response to either a local or remote request. Similar circuits exist to generate output enable and clocking signals for the local interrupt registers as well. Referring to FIG. 5 it should be noted that the request signals 515, 520 and 526 precede the associated timed request signals 516, 522 and 528 in time. The timed request signals indicate that central signals for shared data bus devices are enabled. They are enabled because of the prior presence of the request signals 515, 520 and 526.

Unlike the interrupt registers 454 and 456, which are connected to only one data bus, shared data bus 412, PIO register 452 is connected to two data buses, shared data bus 412 and remote data bus 450. Clocking data into the PIO register from the shared data bus and outputting data from the PIO onto the shared data bus is done by the shared controller. NAND gates 1310 and 1312 combine inputs to generate local and remote request clocking signals CLKPIO while NAND gates 1314 and 1316 combine inputs to generate local and remote output enable signal /OEREG.

When data is clocked into the PIO register with CLKPIO, the shared controller generates a data valid signal /DVPIO which is transmitted over the remote control bus to the remote controller of the processor to which the data will be transmitted. The circuit for generating a /DVPIO is shown in FIG. 14. It is part of the shared controller 440 and comprises: input NAND gates 1402 and 1404; NAND 1406 and dual J-K flip-flop circuit 1408. The control signals used in generating CLKPIO are also used to generate /DVPIO.

The remote controller of the destination microprocessor controls movement of the data from one PIO register across the remote data bus 450 and into another PIO register from the remote data bus. It does this by generating the /OEPIO and CLKREG signals in response to the /DVPIO signal. FIG. 15 shows the details of the remote controller 442 which comprises: first input decode logic including NOR gates 1502 through 1508; 5-8 decoder circuit 1510; QUAD D-flip-flop circuits 1512 and 1514; dual J-K flip-flop circuit 1516; and input circuitry for the dual J-K flip-flop including inverter 1520 and NOR gate 1522. For the case of a PIO data transfer the /DVPIO signal is gated through NOR gate 1506 only when the associated shared controller has decoded a REMOTEW or REGRD control signal. Decode circuit 1510 takes the output of NOR gate 1506 and generates outputs transmitted to QUAD D-flip-flop circuits 1512 and 1514 and dual J-K flip-flop 1516 which, in turn, generate /OEPIO, CLKREG, TACKPIO and FULLIN. TACKPIO is transmitted back to the transmitting shared controller to negate /DVPIO. FULLIN indicates that the local PIO register has the data as described earlier. In connection with FIG. 4, the shared controller uses the FULLIN signal and a microprocessor address to generate an /OEREG to the PIO which places the data on the shared data bus. The /OEREG is used to clear the J-K flip-flop.

Figure 16:
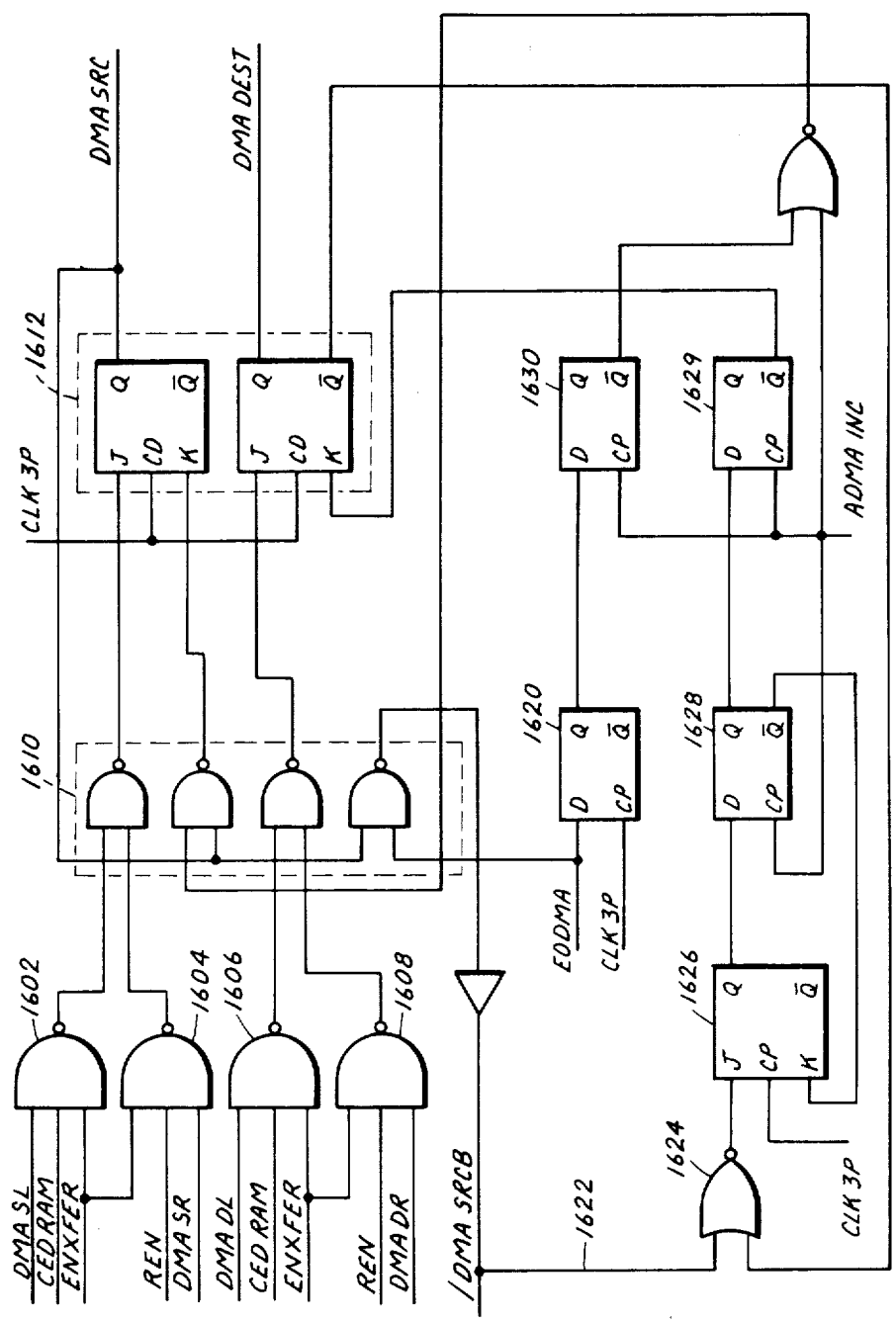
FIG. 16 is a block diagram portion of the shared controller for setting DMA source and destination control signals.

Generation of the interrupt and PIO register clocking and output enabling signal was described above in connection with FIGS. 13-15. Generation of similar signals for the DMAIO register 448 will now be described in connection with FIGS. 14, 15, 16 and 17. In FIG. 16, the input NOR gates 1602, 1604, 1606 and 1608 combine the appropriate control signals (DMASL, DMASR, DMADL, DMADR), timing and synchronization signals (CEDRAM, REN and ENXFER) to generate DMA source and destination register set signals which are gated through intermediate QUAD NOR gate circuit 1610 to set dual J-K flip-flop circuit 1612. The Q outputs from dual J-K flip-flop circuit 1612 are the DMASRC and DMADEST control signals.

Figure 17:
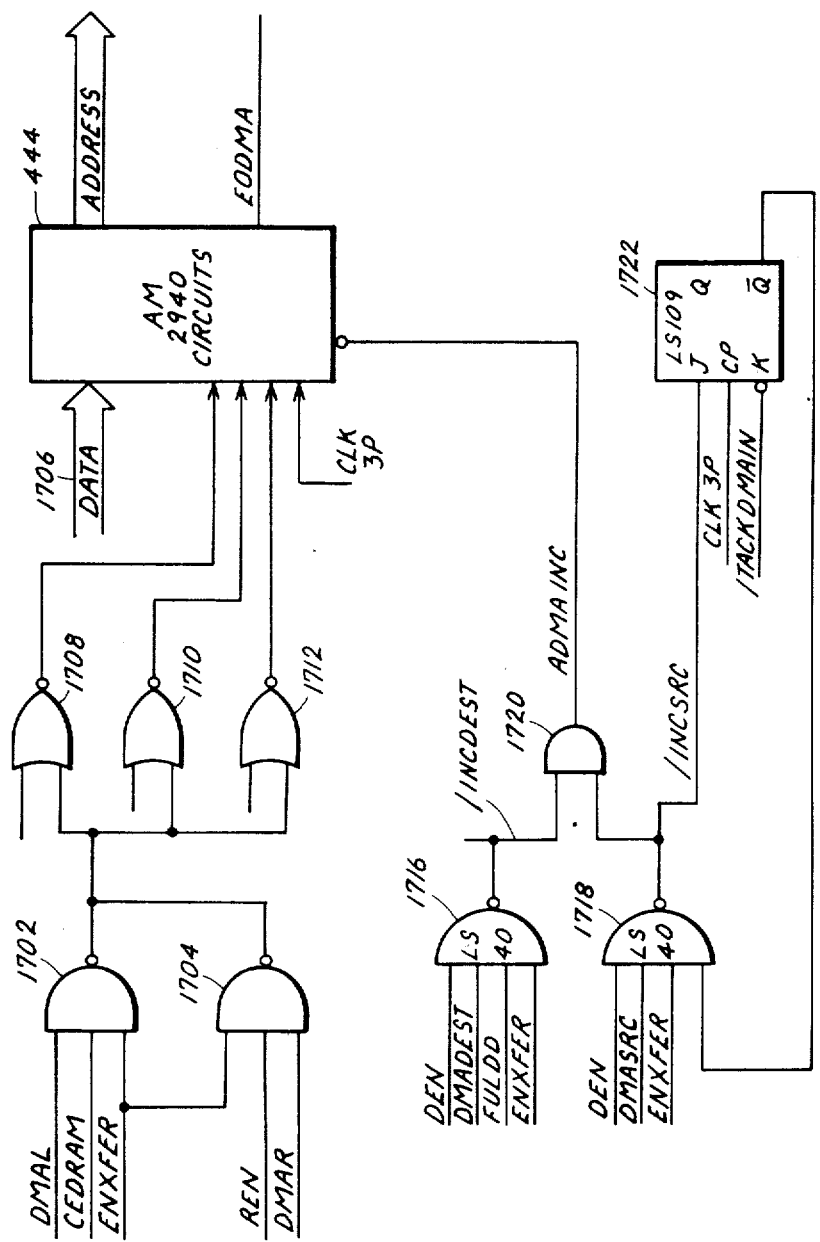
FIG. 17 is a block diagram portion of the shared controller showing the DMA counter and its control circuitry.

Referring to FIG. 10, either the DMASRC or DMADEST signal is used to generate a DMA request for the shared data bus, REQD. As mentioned earlier, this only occurs if no REQL or REQR signal is present. As long as the registers 446 and 447 are set, however, the circuit of FIG. 10 will generate REQD in the absence of REQL or REQR. FIG. 10 also generates a DEN signal in response to REQD with the rising edge of CLK3P. In FIG. 17, input NAND gates 1702 and 1704 combine a local request and local timing and synchronization signals, or a remote request and timing and synchronization signals to load the source or destination starting address or source word count from the shared data bus over bus 1706. The outputs of both NOR gates 1702 and 1704 are combined by NOR gates 1708, 1710 and 1712 with 3 address bits from the master processor to identify whether the word being loaded is a starting address or word count. As soon as the starting address is decoded, it selects a particular address site in one of 8 memory chips.

The DMADEST and DMASRC signals are also used in FIG. 17 to enable incrementing the starting address with clock CLK3P. NAND gates 1716 and 1718 combine either the DMADEST or DMASRC with DEN and ENXFER depending on whether or not the DMA counter 444 is being used as a source or destination counter. The outputs of NAND gates 1716 and 1718 are combined in AND gate 1720 to produce a low counter increment enable signal when either the DMADEST or DMASRC signal is gated through its respective NAND gate to produce a low input to AND gate 1720. After the DMA counters have been set by the master processor or after the counters have been incremented data from an address in the shared memory selected by the DMA counter must be moved from the shared memory through the source and destination DMAI/O registers to a location in the destination shared memory selected by the address in the destination DMA counter. Before the address in the DMA counter can be incremented, the data must be clocked in and out of the DMAI/O. The /INCSRC signal from NAND gate 1718 is transmitted from the shared controller over bus 492 to clock the data from the source shared memory into the source DMAI/O 448. A /DVDMA signal is generated from dual J-K flip-flop circuit 1408 in FIG. 14 in response to the C07 and DEN signals at NAND gate 1410. In response to the /DVDMA or in the absence of an /DVPIO or counter remote request to the remote bus, the circuit of FIG. 15 generates /OEDMA for the source DMAI/0. At the same time, a TACKDMA is generated which returns to FIG. 14 at NOR gate 1412 to clear the J-K flip-flop and negate /DVDMA. At this time the output of inverter 1414 in FIG. 14 (/TACKD-MAIN) is transmitted to J-K flip-flop 1722 which gates DMASRC with a timed shared data bus request signal DEN and synchronization transfer signal ENXFER through NAND gate 1718 to increment source counter 440. The destination counter cannot be incremented until the data output enabled at the source DMAI/0 is safely passed through the destination DMAI/0 and stored in the destination shared memory. At the same time that /OEDMA and TACKDMA are generated the CLKREG signal from FIG. 15 is generated and this clocks the data across the remote bus into the destination DMAI/O.

When the destination shared controller accepts the DVDMA it also generates a signal from 5-8 decoder 1510 to the dual J-K flip-flop circuit 1512 which sets a Q output to provide FULDD indicating that the destination DMAI/0 is able to be filled with CLKREG. FULDD is transmitted to NAND gate 1716 in the destination shared controller to gate the DMADEST at the appropriate time to increment the DMA counter after passing through AND gate 1724. The output of NAND gate 1716 /INDEST is transmitted via bus 492 to the destination DMAI/0 to output enable the data which immediately passes over shared data bus 412 to address the shared memory before the increment signal is enabled.

After the last increment from the source DMA counter, an end of DMA signal (EODMA) is generated by source counter 444. This is used by the source shared controller circuit of FIG. 16 to set flip-flop 1620. EODMA is also gated through NAND gate 1622 by then high DMASRC to transmit /DMASRCB out over lead 1624 to the destination shared controller. The /DMASRCB comes in on lead 1622 and is gated through NOR gate 1624 by /DMADEST to set J-K flip-flop 1626 which, in turn, sets D-flip-flop 1628. D-flip-flop 1628 sets D-flip-flop 1629 which, in turn, clears destination register 447 (that is, one of the J-K flop-flops in dual J-K flip-flop circuit 1612). DMADEST then goes low.

Meanwhile at the source microprocessor, D-flip-flop 1620, set by EODMA, sets flip-flop 1630. The low Q output is gated through NOR gate 1632 by the increment counter signal from AND gate 1720 (ADMAINC) and gated through NAND gate circuit 1610 by DMASRC to clear the DMA source register 446 (DMASRC goes low).

The DMA circuitry in response to the destination and source starting address words and the source word count loaded into the DMA counters by the master processor (via a programmed I/O transfer) and controlled by the prioritized shared data bus request signal circuitry and synchronization circuitry, provides a data transfer among shared memories which occurs independently of any processor's control and during local processing of data stored in the shared memories without interfering therewith. The transfer of data in this way is a distributed a direct memory access data transfer during local processing and without interference with local processing. It is distributed because a source DMA counter is located at one processing location and a destination DMA counter is located at a separate location.

While the present invention has been disclosed in connection with the preferred embodiment thereof, it should be understood that there may be other embodiments which fall within the spirit and scope of the invention as defined by the following claims.

We claim:

1. A distributed processing apparatus for performing a continuous speech recognition function comprising:
    a plurality of processing means coupled by a remote bus and each having a shared memory associated therewith and each for performing local processing on data stored in said associated shared memory; and
    data transfer means associated with each of said processing means and with said associated shared memory and coupled thereto for transferring at least a portion of said data between said shared memories across said remote bus;
    direct memory access circuit means (DMA) for preventing interference with local processing of the remaining portions of said data by said plurality of processing means during said transfer of data.

2. The data processing apparatus of claim 1, wherein said data transfer means further comprises:
    a shared data bus associated with each of said shared memories and processing means and coupled thereto for transferring data between said shared memories and said remote bus and between said shared memories and said processing means associated therewith;
    a remote bus controller for controlling the transfer of data across said remote bus;
    a plurality of circuit means for effecting data transfer across said shared data bus including:
        DMA circuitry for DMA transfer of said data between said shared memories in response to input from at least one of said processing means prior to said DMA transfer;
        programmable I/O circuitry for programmed transfer of data across said remote bus including providing said input to said DMA circuitry; and
        shared controller circuitry for controlling the data transfer across said shared data bus.

3. The data processing apparatus of claim 2, wherein one of said plurality of processing means is a master processing means and the other processing means are slave processing means, said master processing means for controlling said data transfer including providing input to DMA circuitry.

4. The data processing apparatus of claim 3, wherein said shared controller circuitry comprises:
    decode circuitry for decoding local addresses from said associated processing means to generate local and DMA control signals and for decoding remote addresses from said master processing means to generate remote and DMA control signals;
    circuitry for generating prioritized local, remote and DMA requests for said shared bus in response to a first portion of said control signals;
    circuitry for synchronizing said prioritized request signals with the local processing of shared memory data by said slave processor whereby said local processing is uninterrupted; and
    clocking and enabling circuitry for transferring data between said shared data bus and a selected one of said plurality of circuit means.

5. An apparatus for recognizing speech continuously spoken comprising:
    a plurality of processing means coupled together by a remote bus and each having a shared memory associated therewith, said processing means including means for converting said continuously spoken speech into parametric data, means for comparing said parametric data with stored template data, and means for analyzing the results of said comparison; and
    data transfer means associated with each of said processing means and associated shared memory and coupled thereto for transferring said parametric data, template data, and results data among said shared memories; and direct memory access means for preventing interference with the converting, comparing or analyzing of remaining portions of said data during said transferring.

6. The apparatus of claim 5, wherein said plurality of processing means comprises:
    a front end processing means including a speech converting means for sampling said continuously spoken words a plurality of times and converting said sampled words into digital data, said front end processing means for converting said digital data into frames of parametric data corresponding to said samples;
    at least two template processing means for storing said template data and for comparing in accordance with a predetermined algorithm said frames of parametric data with said template data to provide results data; and master processing means for controlling the transfer of said frames of parametric data to said at least two template processing means, the transfer of template data among said template processing means and said results data to said master processing means with each new frame of parametric data.

7. The apparatus of claim 6, wherein said plurality of template processing means comprises at least four template processing means and said apparatus has a vocabulary of at least 300 words.

8. A method of automatically recognizing continuously spoken words in real time using a speech processor which converts said continuously spoken words to parametric data and using at least two template processors which store templates of a vocabulary of words that can be recognized and which compare said parametric data with said templates, said method comprising the step of:

transferring said parametric data and said templates among said speech processor and said at least two template processors without interfering with the conversion of said continuously spoken words to said parametric data or with the comparison of said parametric data with said templates in the course of said transferring whereby the automatic recognition of continuously spoken words in real time is expedited.

9. A method of recognizing continuously spoken words comprising:

converting said continuously spoken words into frames of parametric data more suitable for speech processing in a front end data processor;

storing a vocabulary of words to be recognized as templates in at least two template processors;

transferring said frames of parametric data to said at least two template processors for comparison of said frames with said stored templates; and redistributing said stored templates among said at least two template processors for comparison with a new frame of parametric data while a previous frame of parametric data is being processed.

10. The method of claim 9, wherein the step of transferring said frames of parametric data and the step of redistributing said stored templates is done by a plurality of means for direct memory access.

* * * * *